United States Patent [19]

Austruy et al.

[11] Patent Number: 5,140,691

[45] Date of Patent: Aug. 18, 1992

[54] ADAPTER-BUS SWITCH FOR IMPROVING THE AVAILABILITY OF A CONTROL UNIT

[75] Inventors: Pierre Austruy, Nice; Jean M. Munier, Cagnes sur Mer; Michel Poret, Villeneuve/Loubet, all of France

[73] Assignee: International Business Machines Corp., Armonk, N.Y.

[21] Appl. No.: 577,837

[22] Filed: Aug. 30, 1990

Related U.S. Application Data

[63] Continuation of Ser. No. 176,134, Mar. 31, 1988, abandoned.

[30] Foreign Application Priority Data

Apr. 16, 1987 [EP] European Pat. Off. ............ 37430011

[51] Int. Cl.$^5$ ............................................. G06F 11/16
[52] U.S. Cl. ..................................... 395/575; 371/9.1;
364/DIG. 1; 364/232.2; 364/268; 364/268.3;
364/247; 364/247.8
[58] Field of Search .................. 371/8.1, 9.1; 395/575

[56] References Cited

U.S. PATENT DOCUMENTS

| | | | |
|---|---|---|---|
| 3,882,455 | 5/1975 | Heck et al. ........................... | 371/9.1 |
| 4,610,013 | 9/1986 | Long et al. ........................... | 371/9 |
| 4,633,467 | 12/1986 | Abel et al. ........................... | 371/16 |
| 4,684,885 | 8/1987 | Chapman et al. ................. | 324/73 R |
| 4,823,256 | 4/1989 | Bishop et al. ........................ | 364/200 |

FOREIGN PATENT DOCUMENTS 0083422  7/1982  European Pat. Off. .

OTHER PUBLICATIONS

IBM Technical Disclosure Bulletin, vol. 25, No. 11B, Apr. 1983 pp. 6109–6110.

Primary Examiner—Kevin A. Kriess
Attorney, Agent, or Firm—Edward H. Duffield

[57] ABSTRACT

A Control Unit is described, including a Processing Unit (12) controlled by a Service Processor (14), and a plurality of adapters (18) exchanging data and/or control signals with said Processing Unit (PU). For ensuring a continuous operation of the Control Unit, the adapters are partitioned into at least two sets (56,58), and the PU is partitioned into at least two parts (26,28), each set of adapters being connected to a dedicated PU part by a primary bus (52,54). Besides, in order to allow the fallback of a set of adapters onto another PU part if the PU part to which it is normally connected is inoperative, a bus switching device (30) is provided. This bus switching device includes at least two Switch parts (38,40), and each Switch part performs the switching of a given set of adapters onto a given PU part, according to the status of each PU part. Therefore, each Switch part is connected to a given set of adapters by a primary bus (52,54), and to the other sets of adapters by secondary busses (46,48) which become active in fallback mode.

10 Claims, 13 Drawing Sheets

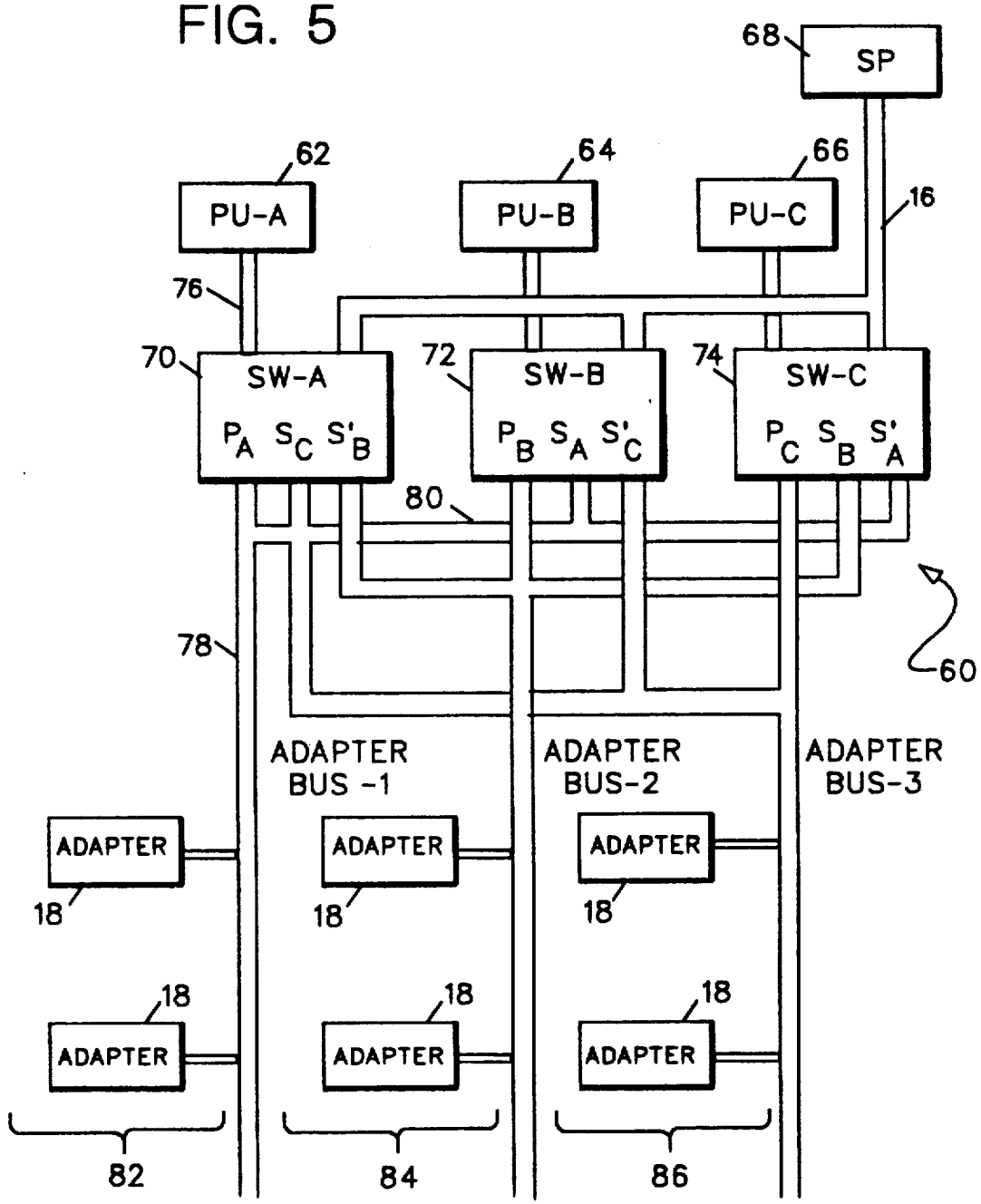

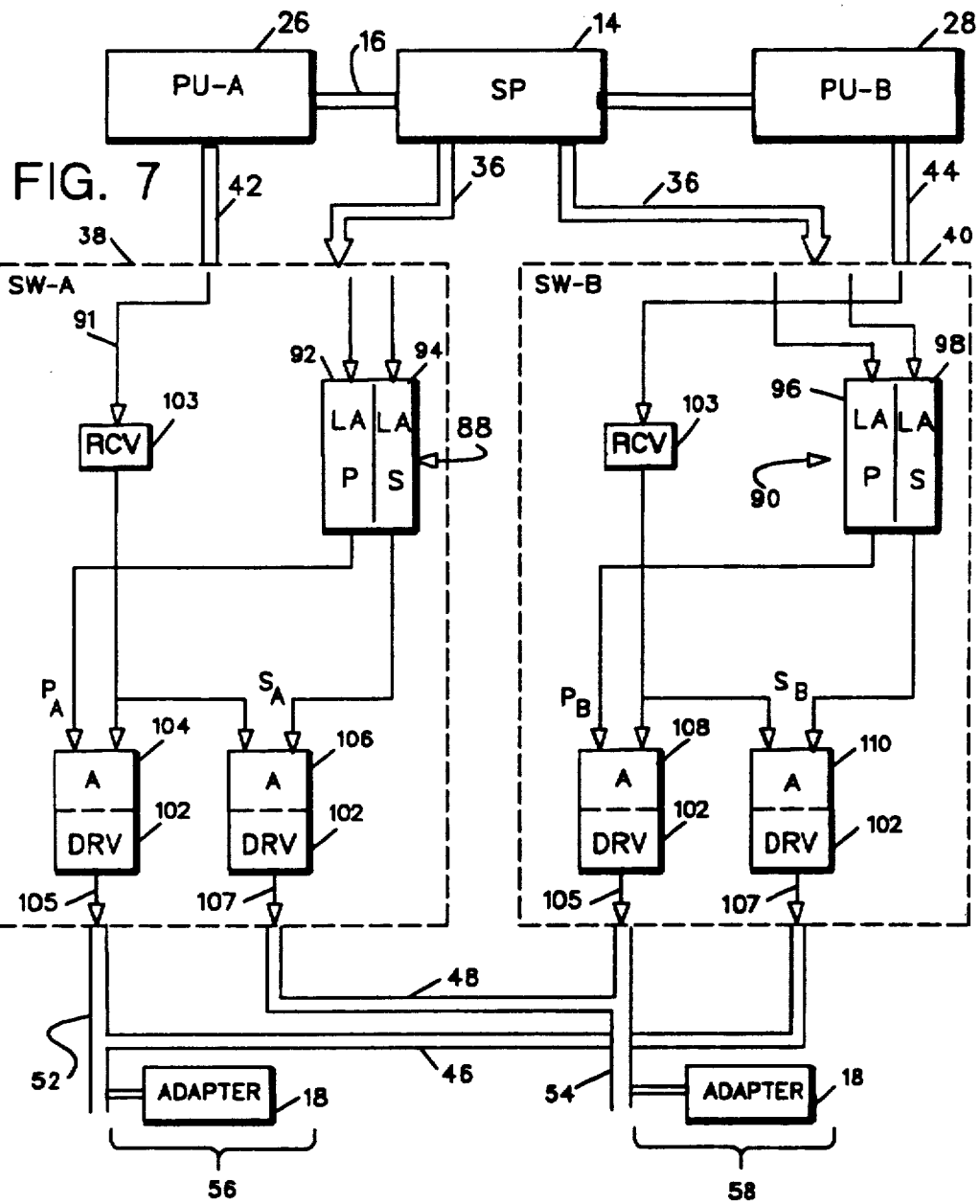

ADAPTER-BUS SWITCH FOR IMPROVING THE AVAILABILITY OF A CONTROL UNIT

This is a continuation of parent application Ser. No. 176,134 filed on Mar. 31, 1988, now abandoned.

FIELD OF THE INVENTION

This invention relates to the structure of a Control Unit which is in charge of managing a plurality of adapters, or other devices such as line adapters of a communications controller, or other devices such as disk drives, tape drives etc. . . The Control Unit is part of a data processing device or network, and has to exchange data and/or control signals with the devices to be managed. The structure of the Control Unit permits improvement of its overall reliability in case one of its sub-parts becomes inoperative.

PRIOR ART

Conventional Control Units are composed of a Processing unit (PU) operating a Control Program (CP), a Service Processor (SP) in charge of various tasks, such as loading the Control Program into the Processing Unit, a communication bus (also referred to as Adapter Bus), and a plurality of adapters.

A major drawback of such a structure is that the Control Unit becomes totally inoperative in case of a failure in either the Processing Unit hardware or the Control Program, since the unique Processing Unit is connected to all the adapters.

Another Control Unit structure is known, wherein the Processing Unit is duplicated, each part being connected in turn to all the adapters by a centralized switching device. This allows to get rid of a single PU or CP failure, but the Bus Switch itself is unique and thus can neither fail nor be powered down without affecting the entire Control Unit function. Accordingly, the aforementioned drawback is not solved by this second Control Unit structure.

OBJECTS OF THE INVENTION

It is then an object of the invention to provide an improved, more reliable Control Unit structure and a protocol for operating said Control Unit, which permit a continuous control of the devices connected to it, even if one or several parts of the Control Unit become inoperative.

It is a further object of the invention to provide an improved Control Unit structure designed to enable the Control Unit to communicate with the devices and adapters without significant decrease of performance when a Control Unit part is inoperative.

SUMMARY OF THE INVENTION

According to the present invention, the Control Unit includes a partitioned Processing Unit and partitioned Switching Means. The Processing Unit comprises at least two independent Processing Unit Parts. Each part of the Processing Unit is connected to a different set of adapters or devices by a dedicated bus. The Switching Means include as many Switch parts as there are independent Processing Unit parts, and they permit, under control of a Service Processor, the disconnection of a set of adapters from a failing Processing Unit part, and the re-connection of said adapters to a valid Processing Unit part.

The present invention further provides a protocol for switching a set of adapters from a first PU part which is inoperative, to a second PU part. This protocol includes the following steps:
- clearing the bus which connects a set of adapters to a first PU part, if the latter is inoperative;
- disconnecting said bus from said first PU part;
- re-connecting said bus to a second PU part which is operative.

BRIEF DESCRIPTION OF THE DRAWINGS

FIG. 5 represents schematically a generalization of the Control Unit structure shown in FIG. 3.

FIG. 6 represents a logical table defining the possible operation modes of the Control Unit represented in FIGS. 7 and 8.

FIG. 7 represents in greater detail the structure of the Control Unit of FIG. 3 for "outgoing" signals.

DETAILED SPECIFICATION

The invention will be better understood if the conventional Control Unit structures are briefly explained.

Figure 1:
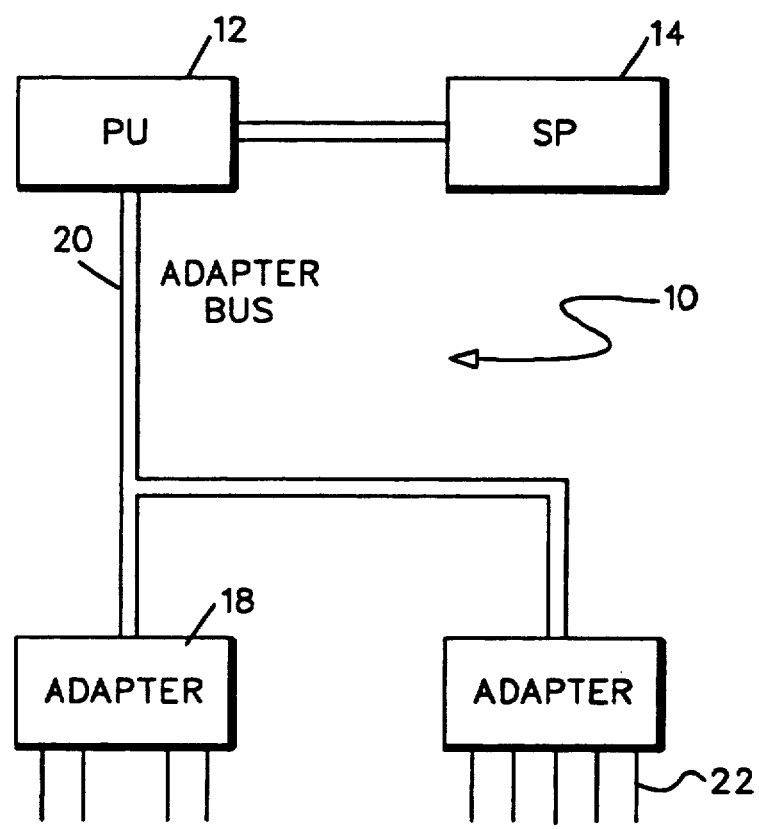
FIG. 1 represents schematically the structure of a conventional Control Unit.

As shown in FIG. 1, a Control Unit (10) is usually composed of a processing unit (12), a service processor (14), a communication bus or adapter bus (20) and a plurality of adapters (18). The processing unit (12) operates a Control Program, which is loaded by the service processor (14) connected to the PU (12) by a control bus (16). Furthermore, the processing unit (12) is connected to the adapters (18) by the adapter bus (20) which comprises a plurality of wires on which circulate data and control signals exchanged with peripheral devices such as disk drives, tape drives, etc., (not shown) connected to the adapters (18) by wires (22).

With such a structure where all the adapters are connected to a single processing unit (12), the Control Unit (10) becomes totally inoperative in case of a failure in either the hardware of the processing unit (12) or in the Control Program. The same is true if the processing unit (12) or the Control Program has to be stopped for maintenance reasons, and the reliability of the Control Unit is accordingly affected.

Figure 2:
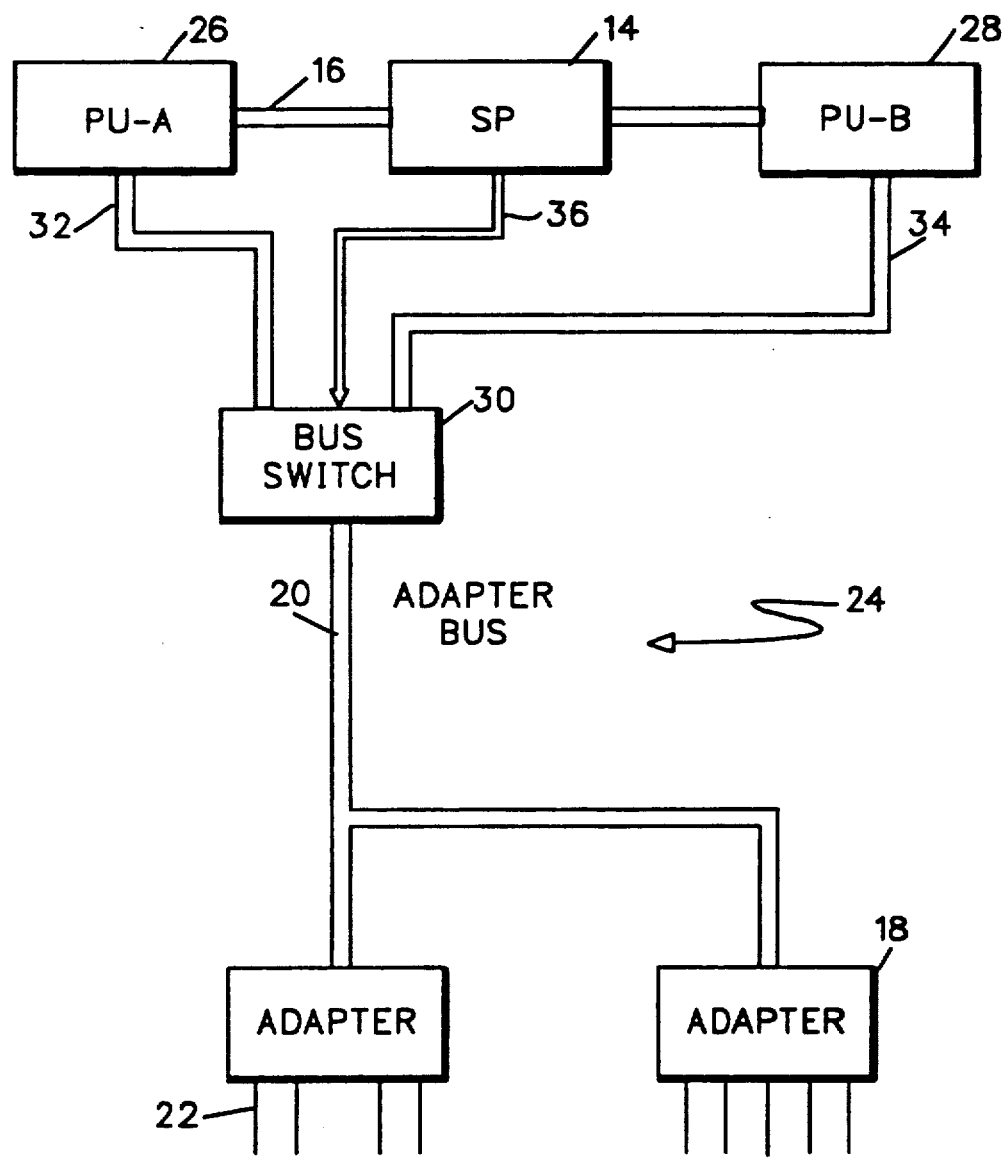
FIG. 2 represents schematically another usual Control Unit structure.

In FIG. 2, another known Control Unit structure (24) is shown, wherein the processing unit has been split into two independent parts (26, 28).

Those independent parts (26, 28) have each a dedicated power supply, and the adapters (18) are powered by still another supply, either individually or by groups of adapters.

The advantage of this structure (24) in comparison to the structure described in FIG. 1 consists in the presence of a bus-switching device (30) connected to the adapter bus (20) on the one hand, and to each of the independent Processing Units (26, 28) by separate busses (32, 34). This bus switching device (30) allows any processing unit (26, 28) to control all the adapters (18), one PU being active at a given time, the other standing by.

The standing-by PU must be ready to take control of the adapters (18) at any time, so a communication link must exist between both PUs (26, 28), for example through a Service Processor (14) connected to each PU part (26, 28) by a control bus (16). Thus, the SP (14) continuously checks the status of both PUs (26, 28), and in case of a failure of one of the PUs, it controls the bus-switching device (30) by way of a control bus (36) in order to have the adapter bus (20) always connected to an operative PU (26, 28) by a bus (32) or (34).

Consequently, this structure allows to get rid of a single PU or CP failure. It also allows to a given PU to be stopped for being serviced, without affecting the operation of the control unit (24).

However, in this known structure, the bus-switching device (30) itself is unique, and thus a failure of it would affect the whole Control Unit operation.

In another known structure this drawback could theoretically be solved by appending a switching device to each adapter, in order to attach a given adapter to either one or the other PU, depending on its availability. But the multiplication of distributed switches at adapter level is much too complex and expensive as soon as the Control Unit comprises a great number of adapters.

Figure 3:
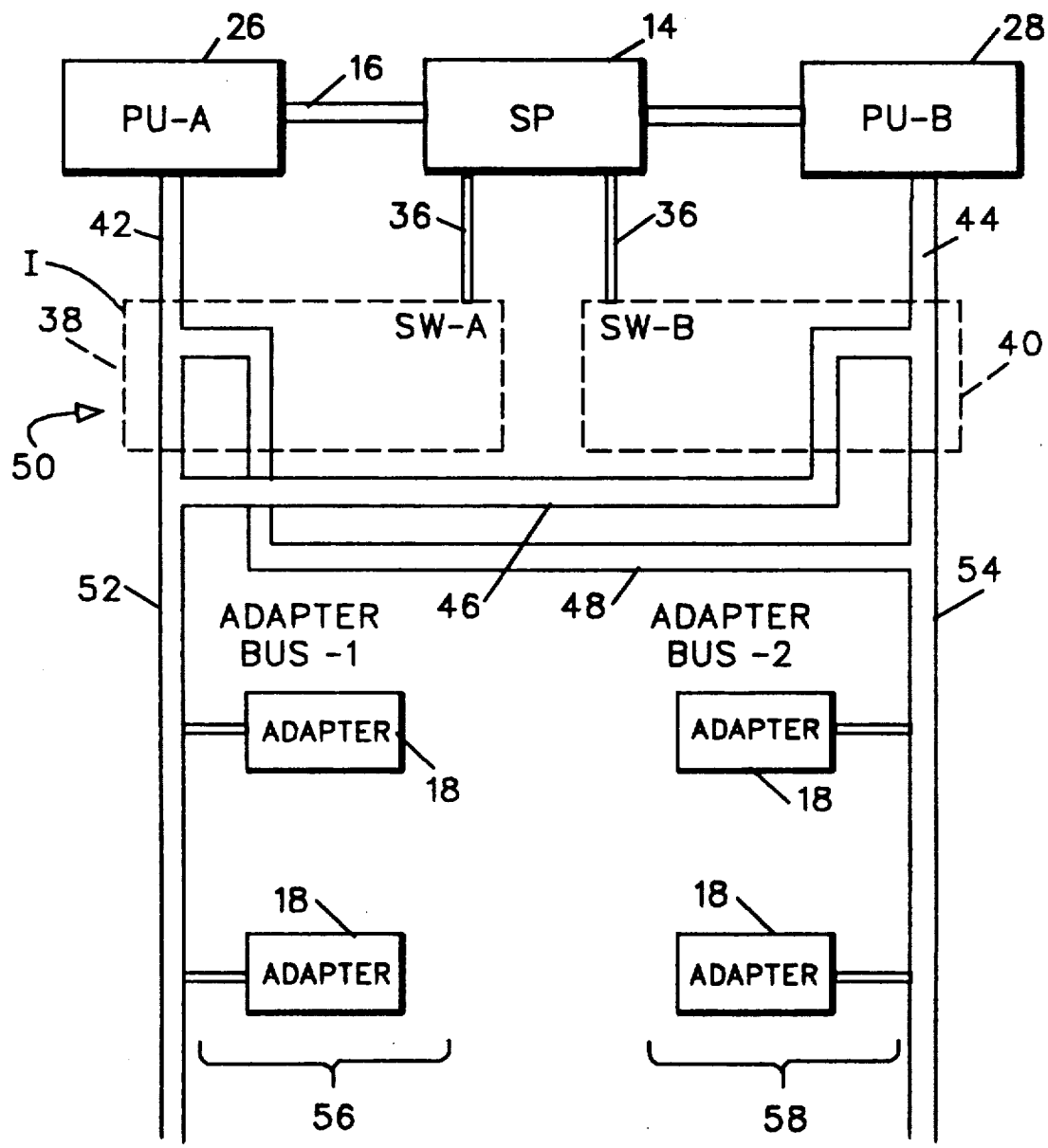
FIG. 3 represents schematically the basic Control Unit structure according to the invention.

The Control Unit structure (50) shown in FIG. 3 corresponds to the principle of the present invention and provides a solution to the drawbacks of both previously described structures (10, 24).

The basic principle consists in using a bus switching device (called "switch" hereafter), composed of two identical switch parts (38, 40). These switch parts are logically independent, but each one is logically part of its associated PU (26, 28).

For brevity of explanation, the switch parts (38, 40) and their associated PUs (26, 28) will also respectively be called switches A and B (or SW-A, SW-B), and processing units A and B (or PU-A, PU-B).

As schematically represented in FIG. 3, the key aspect of the Control Unit (50) according to the present invention consists in using a partitioned PU comprising (at least) two independent PU parts PU-A (26) and PU-B (28), together with a partitioned switching device comprising (at least) two independent SW parts SW-A (38) and SW-B (40), the partitioned switching device being logically associated to the corresponding partitioned parts of the PU.

In other words, SW-A can be seen as a part of PU-A and is, in the best embodiment of the invention, powered by the same source as PU-A (source not represented). Similarly, SW-B can be seen as a part of PU-B and is powered by the same source as PU-B.

Consequently, no SW part exists which would be related neither to PU-A, nor to PU-B.

Practically, it results that the failure of a SW part (either SW-A or SW-B) would have the same impact on the operation of the Control Unit, as a failure of its associated PU. That is to say that in case only one SW part and/or PU part A or B becomes inoperative, the Control Unit can continue to operate, but should do it with less performance.

For using the above Control Unit structure (50) advantageously, the adapters (18) are grouped into two sets (56, 58), each set being connected to a dedicated adapter bus (52, 54) (primary bus).

However, the Control Unit (50) would be of little interest if it only comprised two independent PU parts (PU-A, PU-B) connected each to a dedicated adapter bus (42, 52) or (44, 54). The added capabilities of the SW parts SW-A (38) and SW-B (40) is that they allow the switching of the whole data traffic of the adapter sets (56, 58) onto one PU part (PU-A or PU-B) when the other PU part is inoperative.

Therefore, as shown in FIG. 3, each PU part is connected to its own set of adapters by a primary bus, and to the other set of adapters by a secondary bus. For example, the PU-A is connected to the set of adapters (56) by the primary bus (52) on the one hand, and it can on the other hand be connected to the set of adapters (58) by the secondary bus (48). Similarly, the PU-B is connected to the set of adapters (58) by the primary bus (54) and can be connected to the set of adapters (56) by the secondary bus (46).

Indeed, some device will have to control the switching operations performed by the switching device, according to the status of each PU part (A,B) at a given time: operative, or non-operative owing to a failure or service requirement.

The control of the switching will be done by the SP (14) (Service Processor), which is known in the prior art (cf CU of the IBM 3725 Communications Controller. This SP (14) is connected to each PU part (26, 28) by a control bus (16) which allows it to monitor the status of each PU part. Besides, the SP (14) is connected to each SW part (38, 40) by a control bus (36), on which switching commands are provided to each SW part for changing the connection scheme between the PU parts (A,B) and the sets of adapters (56, 58) when necessary due to failure of a PU or SW part, service, etc. In case of no present failure detected by the SP (14), each PU part A and B controls its dedicated set of adapters (respectively 56, 58) this can be called the "duplex normal" operation mode of the Control Unit. If for example PU-A (26) becomes inoperative (schematically represented by a dotted cross-line in FIG. 4), the set of adapters (56) will be connected to PU-B (28) by way of the secondary bus (46) and on request of the SP (14): this can be called the duplex fallback-B mode, wherein the adapters set (56) previously connected to PU-A falls back onto PU-B, so that all the adapters be connected to the still operative PU: PU-B. Indeed, a symmetrical fallback A operation mode is entered as soon as PU-B becomes inoperative, if PU-A remains operative. It is to be noted that in each fallback mode, the operation of the adapters connected to a PU part (26, 28) by a main bus (42, 44) and a primary bus (52) or (54) is not disturbed by the switch reconfiguration allowing the connection of the adapters which are connected to a secondary bus (46, 48).

It is also to be noted that the operation under a fallback mode as previously described, requires that the control program operated by each PU (A or B) be configured so as to enable a given PU part to control both adapters sets (56, 58). But in what extent the configuration of the Control Program should allow or not a decrease of the performance of the Control Unit in a fallback mode, is a matter of appreciation which is outside the scope of the present invention: accepting a performance degradation in case of fallback, or under-loading each PU in duplex normal mode, if no performance degradation can be tolerated in fallback mode.

Figure 4:
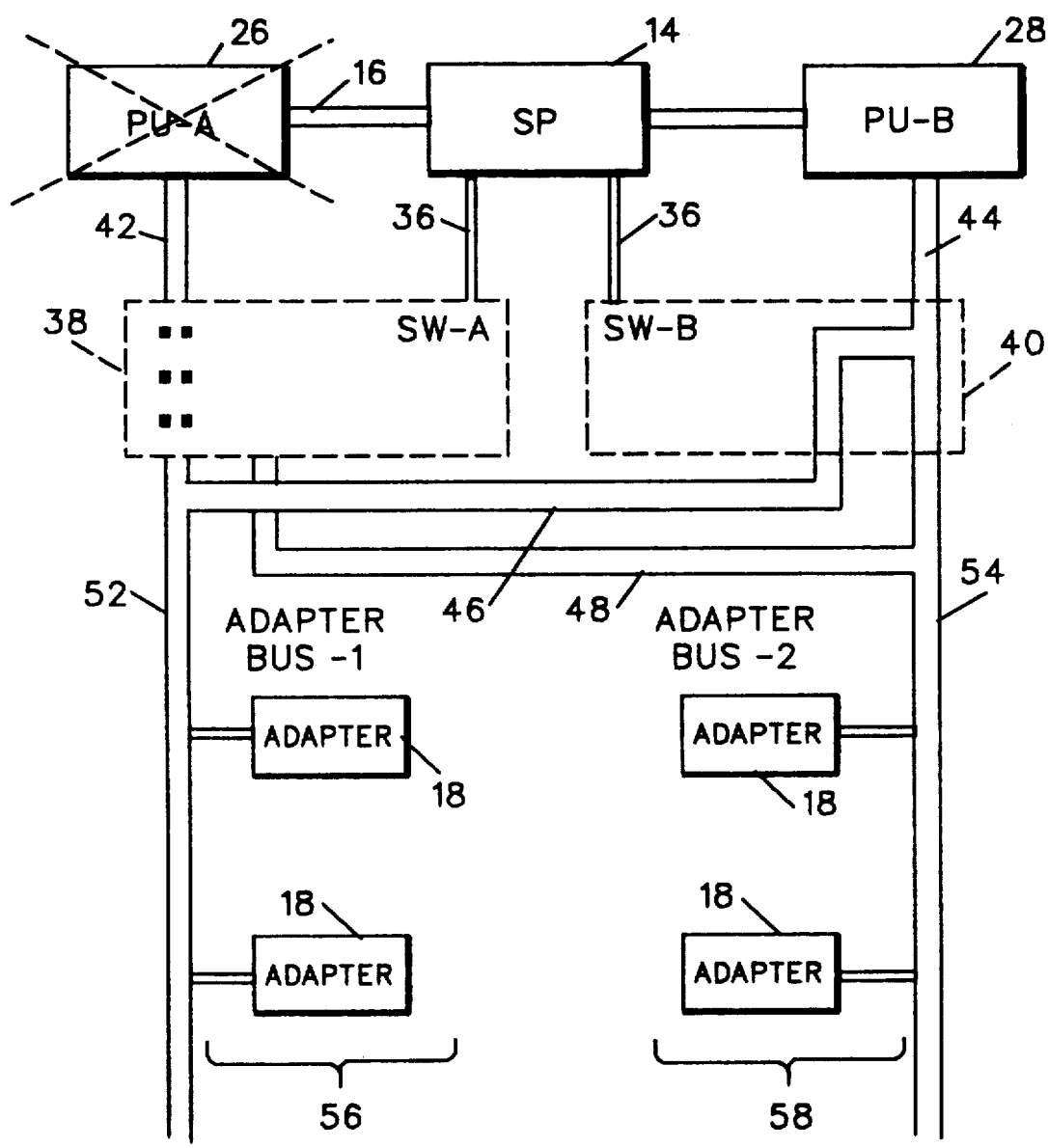
FIG. 4 represents the Control Unit structure of FIG. 3 in a particular operation mode.

With reference to FIG. 5, it will now be described how the basic Control Unit structure shown in FIGS. 3 and 4 can be generalized and extended to more PUs and switching devices. In FIGS. 3 and 4, two PUs were considered. As a matter of fact, the described switch structure (50) can theoretically be generalized to any number PUs. For example, FIG. 5 shows how three PUs (62,64,66) could be connected, each one controlling a set of adapters (82,84,86).

The switching device is now composed of three switch parts: SW-A (70), SW-B (72), SW-C (74). To each signal of a PU bus (76) correspond three signals (P, S, S') on the adapter busses. Thus, when a PU fails or must be stopped, the adapters normally connected to it can be switched to one of the still operative PUs. For example, if PU-A or SW-A becomes inoperative, the set of adapters (82) connected to SW-A by primary bus (78) falls back onto SW-B or SW-C by way of secondary bus (80), according to the control signal sent by SP (68) to SW-A, SW-B and SW-C, on control bus (36). However, a similar fallback operation would be performed if another PU part (PU-B, PU-C) or switch part (SW-B, SW-C) would become inoperative.

It is to be noted that, for a given PU part becoming inoperative, the PU-part on which it will fallback may be determined in advance by any means, for example by fallback tables memorized by the SP.

Although this structure can in theory be generalized to any number of PUs, it will be limited in reality, by the number of adapters to be connected to the PUs, and by the growing complexity of the SP (14) which will have to command the different SW parts.

It should be understood that the Control Unit according to the invention is not meant to be limited to a very specific control unit, for instance a communications controller. In such an application, the adapters are the channel adapters of the communications controller, which connect the Communications Controller to a Host computer, and the line adapters which connect the communications controller to transmission lines through modems, while the Central Control Unit of the communications controller is equivalent to the PU in the present specification. However, although the application of the invention to the Central Control Unit of a communications controller is very advantageous, the control unit of the invention can be fully described in more general terms, as will be done farther.

FIGS. 6 to 9 relate to a basic Control Unit structure according to the invention, said Control Unit comprising two duplicated PU parts PU-A, PU-B and two duplicated SW parts SW-A, SW-B as previously shown in FIGS. 3 and 4. Generally speaking, the busses (42, 44, 46, 48, 52, 54) (FIGS. 7, 8) to be switched contain a given number of bidirectional data wires and outgoing or ingoing signals, the "out" direction of the signals corresponding to signals going from the PU toward the adapters.

It is to be noted that in some communications controllers, the corresponding busses contain 16 data wires and about 15 wires for the transmission of tags or commands. But in the present invention, said busses may contain any number of data or command wires, and the corresponding data a commond will more generally be called "signals".

If it is necessary to make a change of the Control Unit configuration consecutive to a PU part failure, the SP (14) (FIG. 3) will transmit the right commands to the Switch and accordingly, the SW part (38,40) will perform the needed switching of the busses (46,48,52,54). FIGS. 6 and 7 show how the switching commands are transmitted from the SP (14) to the switch parts PU-A, PU-B. Each SW part contains a Switch Configuration Register SWCONF-A (88) or SWCONF-B (90), the use of which will be described farther.

FIG. 7 shows in greater detail the structure of the Control Unit in relation to the outgoing signals (from the PUs and SP to the adapters). Each PU part (26,28) is connected to the SP (14) by a control bus permitting the SP to be informed of the status of each PU (operative, non operative . . . ). PU-A (26) and PU-B (28) are respectively connected to SW-A (38) and SW-B (40) by a bus (42,44) on which outgoing signals are sent through the Switch parts toward the adapter sets (52,54). These outgoing signals are received by receiver circuits (100) which do not have any logical function, but perform the technological adaptation (voltage levels, . . . ) between the PUs and the adapters if necessary. Such receiver circuits are well-known in the art. Accordingly, they are not further described in the present specification.

The output of each receiver circuit (100) is applied in parallel to an AND gating circuit (104,106) in SW-A (or (108,110) in SW-B) comprising two AND gates (104,106) or (108,110). The second input of each AND gate (104,106) receives a gating signal PA and SA (or PB and SB) transmitted by Switch Configuration Register SWCONF-A.88 (respectively SWCONF-B90) composed of two latches (92,94) for SW-A and respectively (96,98) for SW-B.

Again, drivers (102) are needed for transmitting the signals outputted by AND gates (104,106,108,110) to the adapter sets (52,54) which may be separated by a distance of several meters from the SW parts SW-A, SW-B of the Control Unit.

It appears that, according to the binary value (0 or 1) set into each latch (92,94) of SWCONF-A 88, the signal transmitted by PU-A on wire (91) will be outputted by SW-A on wire (105) and/or (107). Thus, according to the content of SWCONF-A 88, the signal on wire (91) will be outputted toward adapter set (56) on primary bus (52) (normal operation mode), or toward adapter set (58) on secondary bus (46) (fallback-A mode), and/or toward both. Similarly, according to the content of SWCONF-B, the signal on wire (95) will be outputted toward adapter set (58) on primary bus (54) (normal operation mode) and/or toward adapter set (56) on secondary bus (48) (fallback-B mode) and/or toward both.. Thus, for each outgoing signal (91,95), the operation performed by a switch part (SW-A,SW-B) consists in transmitting said outgoing signal (91,95) to the corresponding adapter set (56 or 58), or to both in case of a fallback mode.

All the possible situations are shown in FIG. 6, where all the valid contents of the SWCONF registers A and B are represented. For example, if latches (92,94) of SWCONF-A 88, are respectively set to 1 and 0, the signal outputted by PU-A on wire (91) will be gated only through AND gate (104) and transmitted to one (or several) adapters of adapter-set (56). Further, if latches (96,98) of SWCONF-B are respectively set to 1 and 0 too, the signal outputted by PU-B on wire (95) will be gated only through AND gate (108) to one (or several) adapters of adapter-set (58).

This situation corresponds to the "normal mode", wherein each PU part and SW part is in relation with the adapter-set connected to its own primary bus. On the contrary, if for example PU-B is inoperative, the adapter-set (58) can only be addressed by PU-A through SW-A. This requires that the latches (92,94) of SWCONF-A be both set to 1, so that the signal outputted by PU-A on wire (91) be transmitted by SW-A to adapter-set (56) on primary bus (52), and to adapter-set (58) on secondary bus (48). But in the mean time, the latches (96,98) of SWCONF-B must be both set to 0 in order to avoid logical conflicts between busses (52) and (46), or (54) and (48).

FIG. 7 shows that the setting of logical values into the latches (92,94,96,98) of both SWCONF registers is performed by the SP (14) through command busses (36). Indeed, the SP chooses automatically (by software) the right values to be set into said latches, according to the status of each PU part, as detected by said SP.

Thus, the SP chooses the best operation mode (normal, fallback, ...) in order to maintain the Control Unit operative, and loads the latches 92,94,96,98) accordingly. It is to be noted that, although one wire (91) and one gating circuit (104,106) have been represented, the SW-A contains as many wires and gating circuits of that type, as there are outgoing signals transmitted by PU-A. However, the SW-A contains only one SWCONF register, comprising two latches (92,94) providing the gating signals PA (i.e. relevant to primary bus connected to SW-A) and SA (i.e. relevant to secondary bus connected to SW-A). Similar remarks are true for the SW-B.

Figure 8:
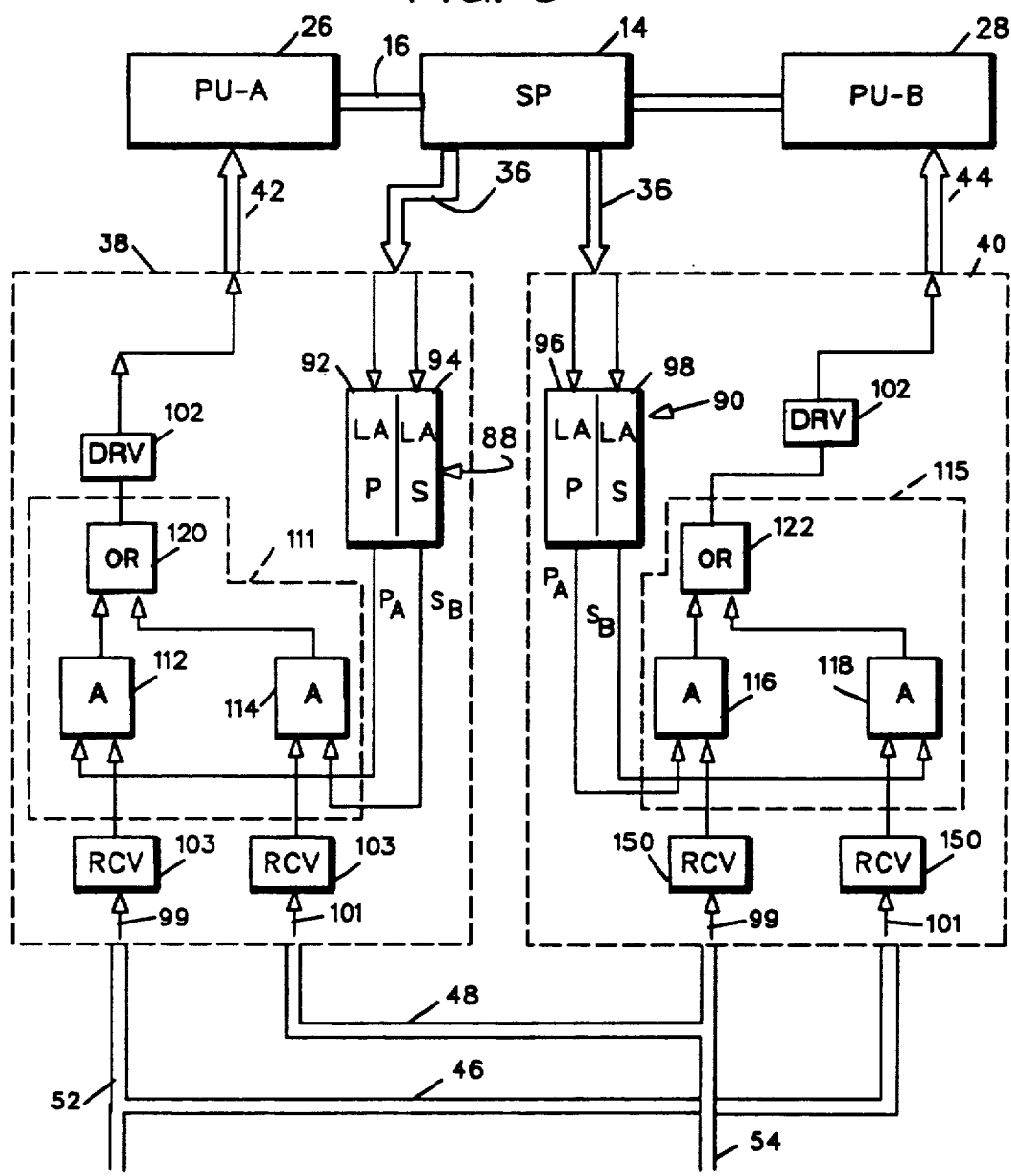
FIG. 8 represents in greater detail the structure of the Control Unit of FIG. 3 for "ingoing" signals.

FIG. 8 shows how the ingoing signals provided by the adapters are transmitted to the PUs PU-A and/or PU-B according to their availability. In accordance with the principle of the present invention, each set of adapters transmits the ingoing signals to both SW parts A and B in parallel. Each SW part comprises one selecting circuit (111,115) per primary (99) or secondary (101) incoming wire. The incoming signals are transmitted to the selecting circuits (111,115) through receivers (100) which, again like the receivers 103, perform the technological adaptation of the signals to the PU technology, and are known in the art. The operation performed by the selecting circuits (111,115) consists in selecting the adapter-set which will have its incoming signals transmitted to a given PU, in accordance with the content of the SWCONF register of said given PU. For example, the selecting circuit (111) of SW-A decides whether an incoming signal on a wire (99) of primary bus (52) will reach PU-A, or whether an incoming signal on a wire (101) of secondary bus (48) will do so.

Therefore, the selecting circuit (111) of SW-A comprises, for each pair of incoming wires of busses (52,46), two AND gates (112,114) having each an entry connected respectively to a wire (99) of primary bus (52) and a wire (101) of secondary bus (48). Furthermore, the other entry of each AND gate (112,114) is respectively provided by the SWCONF-A 88, register (92,94), with the PA and SA signals, these signals enabling the gating of either a signal provided on wire (99) (by adapters-set (56)) or a signal provided on wire (101) (by adapters-set (58)) toward an OR gate (120).

Consequently, at the output of OR gate (120) of selecting circuit (111) of SW-A, either an incoming signal from primary adapter bus (52) or an incoming signal from secondary adapter bus (48) is transmitted to PU-A for being processed. For a better adaptation of logical levels, this transmission is preferably made through a driver (102) similar to the drivers (102) mentioned in relation to FIG. 7.

It is clear that the selecting circuit (115) of SW-B has the same function as selecting circuit (111) of SW-A and accordingly it is symmetrically composed of AND gates (116,118) connected to OR gate (122).

Figure 9A:
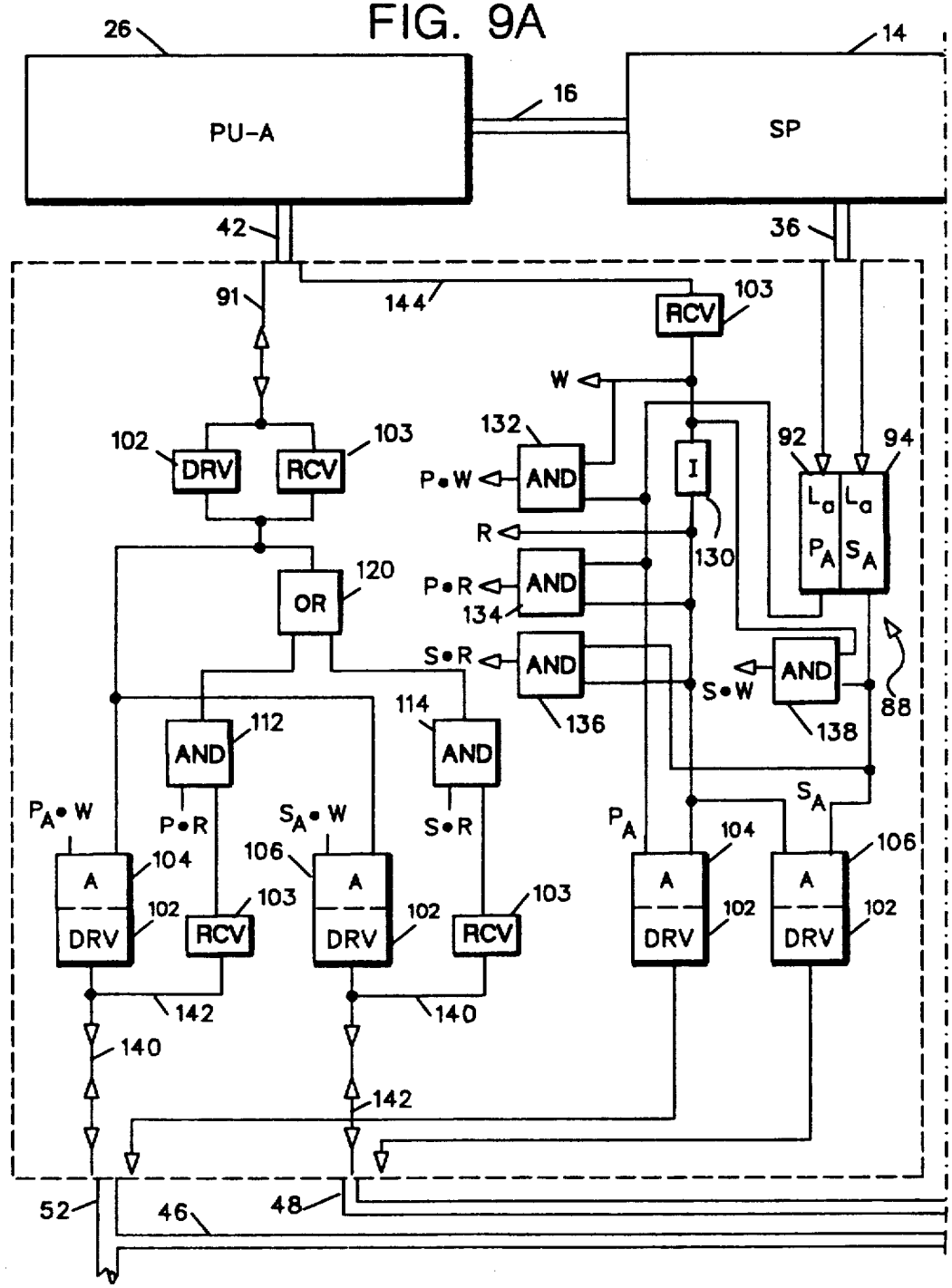
FIG. 9 show how FIGS. 9A and 9B together represent in greater detail the structure of the Control Unit of FIG. 3 for bi-directional signals.
Figure 9:
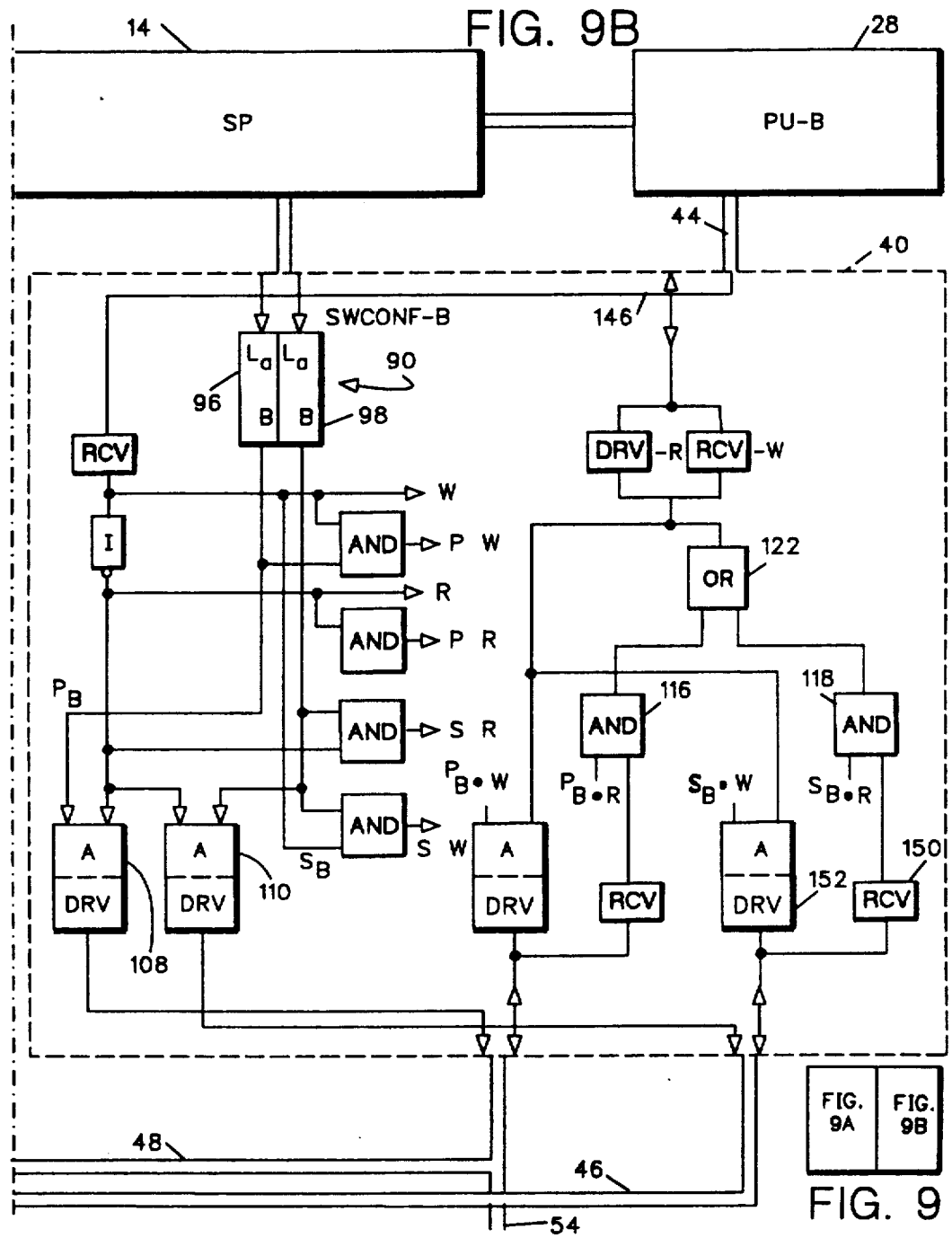

FIG. 9 shows how bi-directional signals are transmitted between the PUs PU-A, PU-B and the adapter-sets. The structure of the SW parts for each bi-directional line, is shown. Thus, SW parts SW-A and SW-B of the Control Unit are in fact, for each bidirectional signal, a combination of the structures shown in FIGS. 7 and 8 for respectively outgoing and ingoing signals, said structures being connected in parallel.

For example, for each bidirectional signal to be exchanged by PU-A and an adapter-set, SW-A comprises for the outgoing direction: a receiver circuit (103) connected to a wire (91) of primary bus (42) and a gating circuit composed of AND gates (104,106) for gating an outgoing signal toward primary bus (52) or secondary bus (48) through drivers (102).

For the transmission of ingoing signals from one of the adapter-sets toward PU-A, SW-A comprises receiver circuits (103) having their entries (140) connected in parallel with the outputs (142) of the drivers (102) used for the transmission of the outgoing signals.

Similarly in FIG. 8, these receiver circuits (103) have their outputs connected to one of the inputs of two AND gates (112,114), the outputs of which are ORed by OR gate (120). The output of OR gate (120) is then transmitted toward PU-A through a driver (102).

It is clear that the SW-B has the same structure as SW-A and performs the same switching function, but between PU-B and the adapter-sets.

However, for transmitting bi-directional signals on some of the wires between each PU part and its primary or secondary adapter-set, it is necessary that the direction of transmission within each switch-part be indicated at every moment. Consequently, a specific outgoing signal W (write) provided continuously by PU-A on line (144) is used, being understood that a symmetrical means is used within PU-B (line 146). This W signal alone is used as an enabling command for receiver (103) (FIG. 9). This W signal is also inverted by inverter (130) which accordingly delivers a Read signal, used as an enabling command for driver (102) connected in parallel to said receiver (103).

Furthermore, the Write signal W is ANDed with the PA and SA signals provided by the SWCONF-A 88, register as described before, by respective AND gates (132) and (138). This results into two command signals P.W. and S.W applied respectively to one entry of AND gates (104,106). Similarly, the Read signal R is ANDed with the P and S signals provided by the SWCONF-A register, by respective AND gates (134) and (136). This results into two command signals P.R and S.R applied respectively to one entry of AND gates (112,114).

From this structure it results, according to the permitted values of PA and SA as shown in FIG. 6, that if the W signal on line (144) is high (W=1), the signal on line (91) will be in the outgoing direction, and will be transmitted toward the primary bus (52) or secondary bus (48) according to the value of the PA and SA signals transmitted to the SW-A by the SP.

For example, if W=1 and PA=1 while SA=0 (normal mode), the signal transmitted by PU-A will cross the receiver (103) and reach AND gate (104). There, since P.W=1 and S.W=0, it will only be gated through the driver (102) connected to AND gate (104), and thus, it will reach the primary bus (52) leading toward the primary adapters-set.

In another example, if W=1 while PA=1 and SA=1 (fallback mode on PU-A), the signal transmitted by PU-A will cross both AND gates (104,106) since P.W=1 and S.W=1. Thus, it will reach both the primary bus (52) leading to the primary adapters-set, and the secondary bus (48) leading to the adapters-set connected to PU-B and SW-B.

In still another example, for an ingoing signal to be transmitted by an adapter set, to one of the PUs PU-A or PU-B according to the decision of the SP, said ingoing signal will reach a given PU only if the Read signal is high: R=1.

If the incoming signal is provided by the primary adapter-set (56) (FIG. 4) on a wire of primary bus (52), it will be applied to both the SW-A and the SW-B (on secondary bus (46)). Thus it will reach the inputting receiver (103) of SW-A and the inputting receiver (150) of SW-B. Then, if PA=1 and SB=0 (fallback-A mode), the ingoing signal will cross AND gate (112) of SW-A and reach PU-A through OR gate (120) and driver (102), while said signal will not be able to cross AND gate (118) of SW-B, since SB=0 and SB.R=0 (with positive logic).

Of course, all the possible operation phases of the SW parts SW-A and SW-B will not be described herein, but could easily be obtained with the previously described structure of the switch, if the signals PA, SA, PB, SB and W, R are given all the valid values.

However, among the 16 different combinations of values PA, SA, PB, SB, some are not valid, because they would lead to conflicts on busses. For example if W=1 (outgoing signals) and if PA=1, the SB signal available in SW-B must be low: if the logical value of SB became equal to 1 while PA=1, it would mean that both SW parts could transmit outgoing signals on busses (52) and (46) through respective drivers (102) and (152) (FIG. 9). This would lead to conflicts on bus (52) since bus (46) is connected to it.

Besides, since drivers (102) and (152) have their outputs connected together through busses (52, 46), they must be technologically glitch-less when powered up or powered down, and must present a high impedance when powered down, in order to avoid interactions. Indeed, the same remarks are true for the drivers connected to busses (54, 48).

Although the structure of the Control Unit as detailed with reference to FIG. 9 permits the basic switching function between two PUs and two adapter-sets, the best embodiment of the invention comprises several additional features for a more reliable operation of the Control Unit.

These additional features will now be described, with reference to FIGS. 10 to 14.

In all the previous developments, it was assumed that it is always possible for the SP to accede to the latches (92, 94, 96, 98) of the SWCONF registers for defining the operation mode of the Control Unit. However, this may be difficult in some cases, and the additional features that are provided are aimed to enable a very reliable loading and controlling of said SWCONF registers. In the Control Unit, the actual configuration status of each switch part is contained in its SWCONF register (FIG. 9). It would be quite dangerous, as far as the availability of the system is concerned, to alter the content of the SWCONF registers by simple Write commands issued by the SP (14).

Thus, a more complex procedure must be followed by the SP, including confirmations of the various contents of the command registers, for minimizing unexpected SWCONF registers modifications due to hardware or software failures in the Service Processor.

Figure 10:
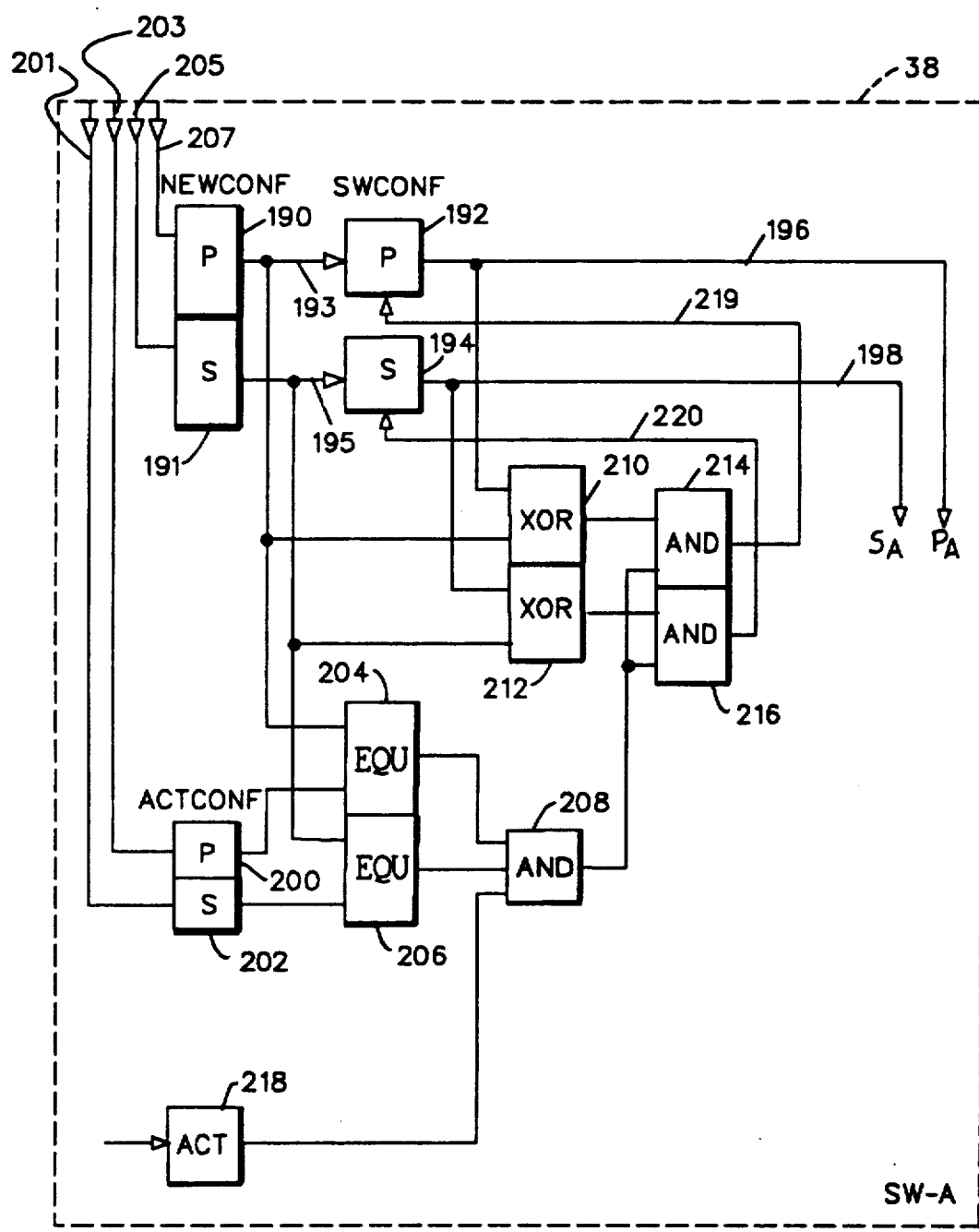
FIGS. 10 and 11 represent in greater detail two possible implementations of features within sub-part I of FIG. 3.

This aim is achieved with the status control means shown in FIG. 10, related to only one SW part (for instance SW-A) for more simplicity, being understood that the same features exist within SW-B.

The SW-A comprises two additional registers NEWCONF (NEW CONFIGURATION) and ACTCONF (ACTIVATE CONFIGURATION), each of which comprises two cells (190, 191) and (200, 202). These registers NEWCONF and ACTCONF are made accessible through wires (201,203,205,207) to the Service Processor (not shown), which may modify their content, in order to allow any change of switch configuration (FIG. 10). Thus, NEWCONF register (190, 191) can be loaded with the P,S bits corresponding to the expected configuration, and ACTCONF register (200, 202) must have the same new configuration pattern as the one specified in NEWCONF, when an ACTSW (ACTIVATE SWITCH) latch (218) is set ON. The event of NEWCONF and ACTCONF having the same content is tested by comparators (204,206), the outputs of which are ANDed in AND gate (208), together with the status of ACTSW latch (218).

Besides, the contents of SWCONF and NEWCONF registers are compared by XOR circuits (210, 212), the outputs of which are applied through WORKCONF register (224, 226) (later explained), to AND gates (214, 216), together with the output of AND gate (208) mentioned above. As a result, the new values (P,S) for the determination of the new configuration of the SW, are gated from the NEWCONF register (190, 191) into the SWCONF register (192, 194) only if the new configuration is different from the one present in the SWCONF register, and if the SP simultaneously gives (by means of ACTCONF and ACTSW) an authorization for transferring the new configuration into the SWCONF register (192, 194).

Any mismatch between NEWCONF and ACTCONF will keep the SWCONF unchanged.

Similarly, SWCONF is altered only if NEWCONF and ACTCONF patterns are different from the pattern of bits present in SWCONF.

NON-DISRUPTIVE SWITCHING OPERATION

In the above description, the SWCONF register of a given SW part is updated as soon as the SP has loaded NEWCONF and ACTCONF with the values corresponding to the new configuration expected, and ACTSW latch has been set ON.

In fact, it is important to be sure that this operation is non-disruptive. As an example, if a SW configuration change must be performed from duplex normal mode to fallback-B mode, this change must not disturb the operation of PU-B with its own adapters-set (58) (FIG. 7). In this example it is therefore necessary to perform the configuration change while there is no activity on the adapter-bus driven by PU-B through SW-B. Two possible alternatives are then to be considered as far as the main busses (42,44) connected between the Switch parts and the PU parts are concerned:

Upon SP control, a specific "bus disable" line (not shown) can be raised by the SW part to its associated PU part just before a configuration change is to be done by the Service Processor. The PU must then terminate its current data transfer (if any) and stop serving any new transfer request from adapters. The configuration change thus takes place during a "switching window" defined by bus disable line being active, and no data transfer being granted any longer.

More currently, it is not possible to add a new bus line (as previously the "bus disable" line). However, conventional bus control lines exist to indicate that a bus activity is in progress, and thus permit to design a feature ensuring a non-disruptive switching operation.

Figure 11:
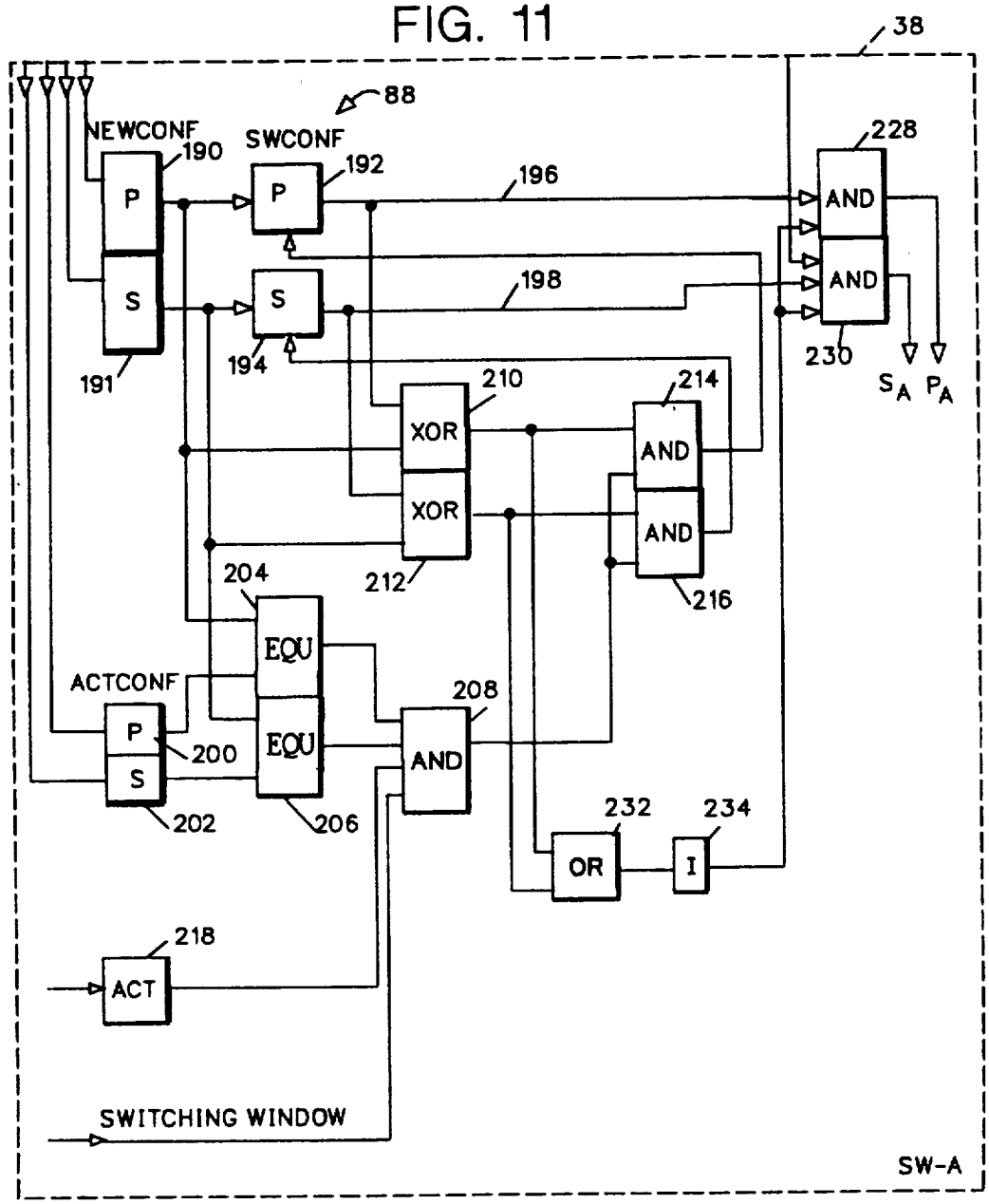

Such a bus control line 225 called "operation in progress" is shown in FIG. 11. It is activated by the PU at the beginning of each data transfer. In this case, the switching window is defined by the fact that the "operation in progress" line is inactive.

FIG. 11 shows how the "SWITCHING WINDOW" signal is used as an entry to AND gate (208), the output of which must be high for enabling the content of SWCONF (192, 194) to be changed by NEWCONF (190, 191).

However, a switching window (during which the values of P and S may be modified, to change the Control Unit operation mode), is defined by a logical combination of the contents of NEWCONF register (88) and the I/O line (225), as shown in FIG. 11. More accurately, the outputs of AND gates (228, 30) transmit the right values of P and S, which determine the operation mode after switching, provided that the inputs of said AND gates (228, 230) receive the adequate values: I/O line (225) high (i.e. PU inactive), output of invrter (234) high, and SWCONF register (88) containing the same values as NEWCON register.

However, it is necessary to get rid of the case in which "operation in progress" line would become active just after the switching window has been activated. Therefore, a WORKCONF register (224, 226) is provided, the content of which is different from (0, 0) only when NEWCONF is different from SWCOF (configuration change in progress). The outputs of both latches (224, 226) are ORed by OR gate (232) and inverted by inverter (234). Thus, the output of inverter (234) is high only if both WORKCONF latches are zero. This event is used toallow the propagation of "operation in progress" signal on line (225) throug AND gates (228, 230).

As long as WORKCONF is not all zero, the output of inverter (234) inhibits propagation of "operation in progress" signal, thus allowing a configuration change.

RESET LINE

Figure 12:
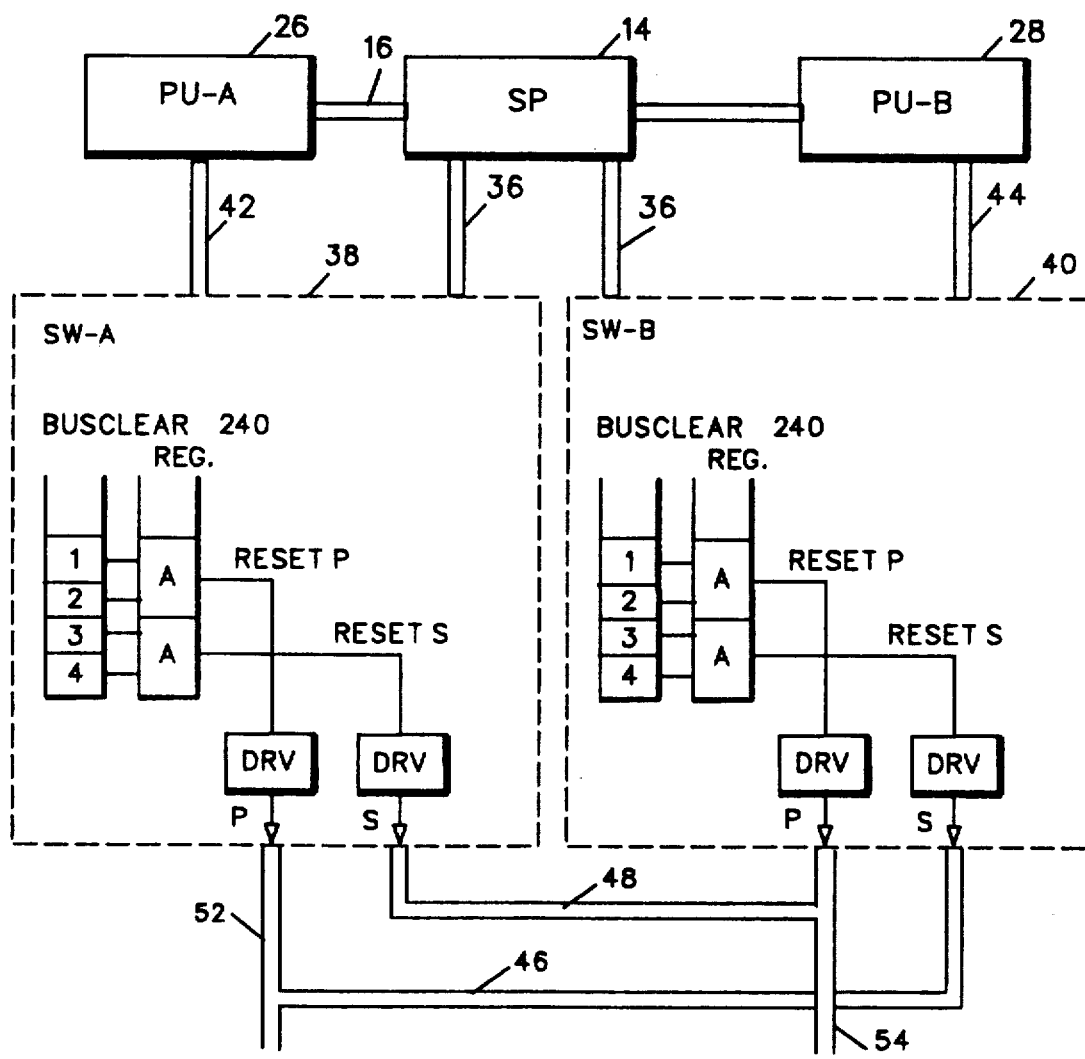
FIGS. 12 and 13 represent the implementations of two additional features provided by the Switch parts shown in FIG. 3.

When the SP decides to perform a switching action from duplex to fallback mode after a failure of one of the PUs, the adapter-bus connected to the failing PU, which is to be switched onto the still operative PU, is in an unknown state. Therefore, it is necessary to perform an adapter-bus Clear operation, before changing the SW configuration. This is done by activating a special adapter-bus line called RESET line (FIG. 12). When receiving this signal, each adapter clears its bus interface, i.e. no more control in, data, request or interrupt lines are active on the adapter-bus, and thus each adapter connected to the failing PU is ready, once the adapter-bus has been cleared, to accept a command from the still operative PU after switching.

This adapter-bus Clear operation is mandatory to avoid any disturbances on the adapter-bus onto which the adapter-bus presently in trouble will be connected after the switching.

Normally, the resetting of the adapter-bus connected to a given PU part and SW-part should be done by the SP through said SW-part.

But it may happen that the failure which needs a fallback be such that the SP cannot use the RESET line of the failing SW-part to clear the corresponding adapter-bus.

This is particularly the case if the failure is due to one of the SW-parts (and not to a PU-part). To allow an Adapter Bus Clear operation in all cases, the SW structure is such that the SP can clear any adapter-bus through any SW part, regardless of the SW configuration.

To achieve this, each SW part comprises, as shown in FIG. 12, a BUSCLEAR register accessible by the SP, said BUSCLEAR register being able to generate a RESET-P signal, and a RESET-S signal. For more reliability when a reset signal has to be generated, each BUSCLEAR register comprises four bits: two Busclear bits (1,2) must be simultaneously active to activate the RESET-P signal, and two Busclear bits (3,4) must be simultaneously active to activate the RESET-S signal.

This allows,to SP running diagnostic programs (out of the scope of the invention) to perform a complete BUSCLEAR register test without actually generating a RESET signal, simply by reading back one bit of BUSCLEAR register after the other and checking it. The RESET-P and RESET-S signals are respectively outputted of the SW parts as particular lines of primary busses (52,54) or secondary busses (46,48) as shown in FIG. 3.

DISCONNECT SWITCH

Further, in case of a severe failure in a SW part (SP control bus failure or SW part internal error), it is necessary to have a DIRECT way to disconnect the adapter bus from this SW part in order to allow a fallback reconfiguration.

Figure 13:
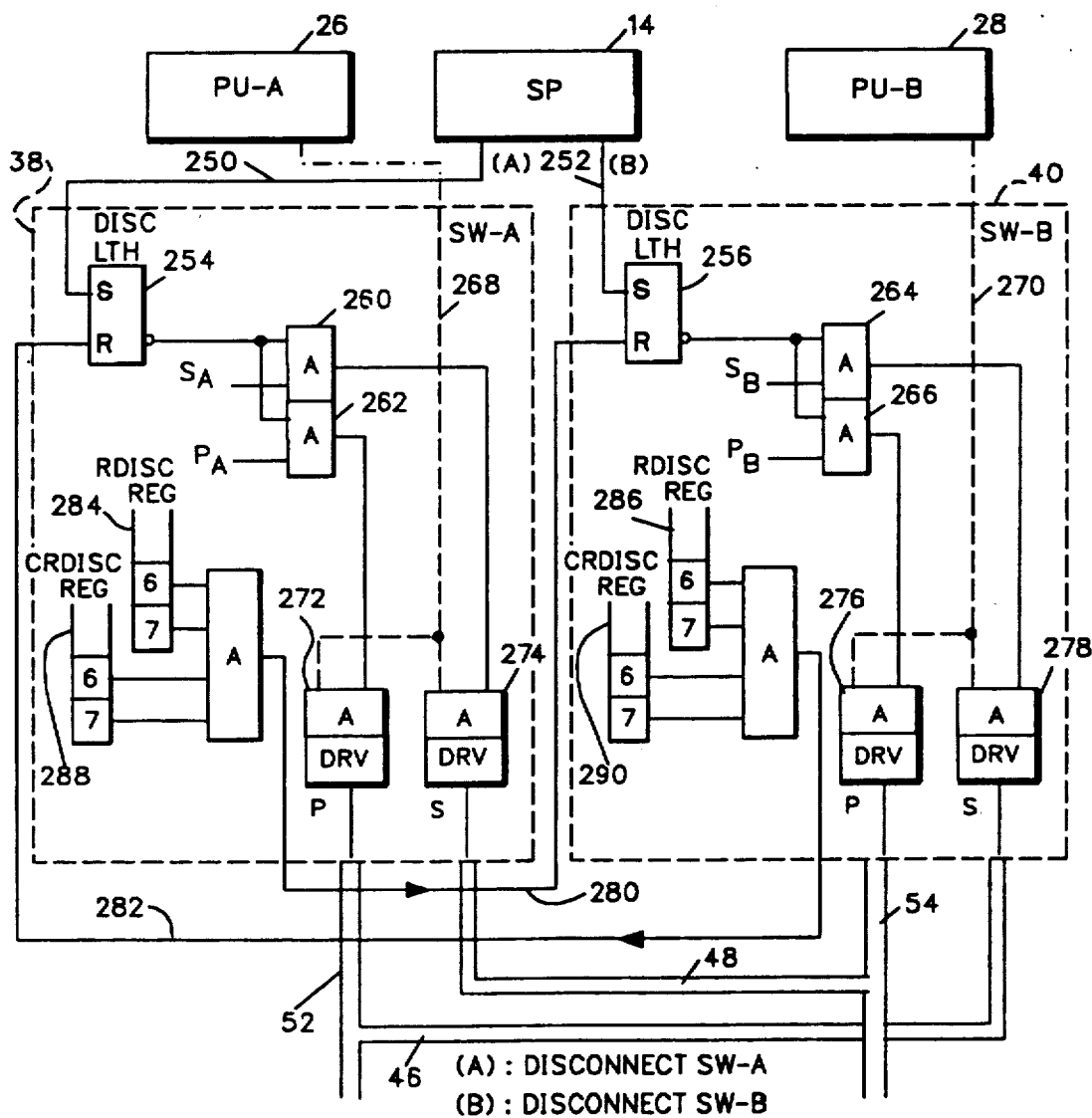

Therefore, as shown in FIG. 13, the SP uses two special lines (250, 252), one per SW part, called "DISCONNECT SW-A" and "DISCONNECT SW-B".

In each SW part, the corresponding "DISCONNECT SW" signal is latched into a "DISCONNECT LATCH" (254, 256), the output of which is ANDed (AND gates 260,262,264,266) respectively with the PA, SA, PB, SB signals provided by the SWCONF registers (not shown). Whatever the status of said PA, SA, PB, SB signals is, any outgoing or bidirectional line (268,270) can be logically disconnected, as soon as a DISCONNECT LATCH (254,256) sends a "zero" to AND gates (272,274,276, 278) through AND gates (260,262,264,266).

This is equivalent to a physical disconnection (such as SW part powered-off or removed) of the SW part corresponding to the active DISCONNECT LATCH.

Furthermore, each latch (254, 256) can be reset by a command sent from the other SW part on lines (280, 282), said command resetting the status of the DISCONNECT LATCH of a given SW part (which is equivalent to a reconnection of said SW part).

The reset command sent by a given SW part to the other SW part is generated by two dedicated registers RDISC (Reset Disconnect) (284) for SW-A and (286)

for SW-B, and CRDISC (Confirm Reset Disconnect) (288) for SW-A and (290) for SW-B.

For a better reliability and serviceability, two bits must be active in both RDISC and CRDISC registers of each Switch part, in order to be permitted to reset the DISC latch of the other SW part.

According to the previously described features, a switching operation from duplex normal mode to duplex fallback-B mode (for example, if PU-A became inactive) would require following stages:

1. Clear the adapter bus (52) connected to the inactive PU part (26), in order to avoid conflicts on said bus (due to erroneous values) when it is going to be connected to the active PU part (28).
2. Disconnect the adapter bus (52) from the inactive PU part (PU-A). This would require:
    writing zeroes into the NEWCONF register (88) of the SW part (SW-A) corresponding to the failing PU part (PU-A).
    writing zeroes into the ACTCONF register (200,202) of the same SW part (SW-A).
    setting ON the ACTSW latch (218) of the SW part corresponding to the failing PU part.

If these operations revealed unsuccessful (i.e. SW-A also inoperative), it would be necessary to issue a DISCONNECT SWITCH command through the SP (as explained in relation to FIG. 13), in order to have PU-A really disconnected from its dedicated adapter bus (52).

3. Connect adapter (52) to the still active PU part (PU-B) through secondary bus (48).

This means that all the adapters of adapters-set (56) fall back onto PU-B. This operation would require following operations to be done by the Service Processor:
    writing all ones into the NEWCONF register (90) of the SW part (SW-B) corresponding to the still active PU (PU-B).
    writing into ACTCONF register of SW-B, the same pattern as the one contained in NEWCONF register of SW-B.
    setting ON the ACTSW latch of the same SW part (SW-B).
    resetting the ACTSW latch of said SW part (SW-B).

Once these operations have been done by the SP, the Control Unit is in fallback-B mode, and all the adapters of both adapter-sets (56, 58) are connected to PU-B through SW-B. This permits to PU-A to be fixed, if necessary, and then a reverse switching operation can be done: from duplex fallback-B mode to duplex normal mode, with two phases analog to those previously described:
    Disconnect the secondary bus (48) connecting the set of adapters (56) to the active PU part (PU-B).
    Re-connect said set of adapters (56) to the other PU part (PU-A) by primary bus (52).

It is to be noted that the switching from duplex fallback to duplex normal mode does not require, at first, the adapter bus to be cleared: since it was connected, just before, to an active PU, it normally should not contain erroneous logical levels on its lines.

Having thus described our invention with reference to a preferred embodiment thereof, what is desired to be protected by Letters Patent is set forth in the appended claims by way of example only and not by way of limitaiton in which what is claimed is:

1. A Control Unit (CU) including a Processing Unit (PU) and a plurality of adapters with which said PU exchanges data and/or control signals on a reliable basis, said PU operating a control program under control of a service processor connected to the PU and monitoring its status, said adapters being partitioned into at least two sets and the PU being similarly partitioned into at least two independent PU parts, PU-A and PU-B, and including at least two sets of interconnection buses comprising primary and secondary buses, and at least two bus switching devices SW-A and SW-B, a given set of said adapters being connected to a given said PU part by one of said bus switching devices, each of which switching devices is connected to and is responsive to the status of each PU part connected to and monitored by the service processor, for connecting each given set of adapters to a dedicated PU part through a primary bus and each other set of adapters to the same PU part through secondary buses,
    each said switching device SW-A and SW-B being connected to a dedicated PU part PU-A or PU-B and further being characterized in that:
    each of said switching devices, SW-A and SW-B, includes a switch configuration register, SWCONF-A and SWCONF-B, and an activate configuration register, ACTCONF-A and ACTCONF-B, each of said registers being under control of said service processor for generating a switching control signal each of said registers being modified by said service processor during a time while no primary or secondary bus is active.

2. Control Unit according to claim 1, wherein said SWCONF registers (88,90) are respectively composed of two latches (92,94) and (96,98) loaded by the Service Processor (14), through command busses (36), with logical values corresponding to the operation mode of the Control Unit, as chosen by the Service Processor.

3. Control Unit according to claim 2, wherein the outputs of said latches (92,94) and (96,98) of the SWCONF registers are applied as gating signals (PA,SA) and (PB,SB) in parallel to gating circuits (104,106) of SW-A and (108,110) of SW-B, said gating circuits forwarding the data transmitted by the Processing unit parts PU-A and PU-B, toward adapter-sets (56,58).

4. Control Unit according to claim 2, wherein the Service Processor (14) chooses the logical values to be set into said SWCONF registers (88,90) for determining the best possible operation mode among the following:
    a NORMAL mode, wherein each Processing Unit part (26,28) is connected to a dedicated adapter-set (56,58) by its respective Switch part (38,40) and its respective primary bus (52 or 54), the secondary busses (46, 48) being inactive,
    a FALLBACK-A mode, wherein, PU-B and/or SW-B being inoperative, both adapter-sets (56,58) are connected to PU-A (26) by SW-A (38) and the corresponding primary and secondary busses (52,46), the primary bus (54) connected to PU-B being inactive,
    a FALLBACK-B mode, wherein, PU-A and/or SW-A being inoperative, both adapter-sets (56,58), are connected to PU-B by SW-B and the corresponding busses (54,48), the primary bus (52) connected to PU-A being inactive.

5. Control Unit according to claim 2, wherein each of said Switch parts SW-A (38) and SW-B (40) includes one selecting circuit (111) (respectively (115)) per signal provided by the adapter-sets (56,58) and to be transmitted to the PU-A (26) (respectively PU-B (28)), said selecting circuits (111) and (115) being respectively responsive to the gating signals (PA,SA) and (PB,SB)

for selecting among two incoming signals (i.e. one signal per adapter-set) the one to be transmitted to the PU-A (26) (respectively PU-B (28)), in accordance with the content of said SWCONF reigsters (88, 90).

6. Control Unit according to claim 5, wherein each of said selecting circuits (111) and (115) includes two AND gates (112,114) (respectively (116,118)), and an OR gate (120) (respectively (122)), each AND gate receiving an incoming signal transmitted by an adapter-set (56,58) and a gating signal (PA,SA) (respectively (PB,PB)), and having its output connected to one of the inputs of the OR gate (120) (respectively (122)).

7. Control Unit according claims 3 or 5, wherein each said switching device SW-A or SW-B includes gating circuits (111,115) connected in parallel, for transmitting bidirectional signals between the Processing Unit parts (26,28) and the adapter-sets (56,58).

8. Control Unit according to cliam 2, wherein each said switching device includes status control means comprising a NEWCONF register (190,191), and an ACTSW latch (218) accessible to the SP (14) for controlling the loading of said SWCONF registers (192,194,196,198) with the bits corresponding to a new Control Unit status.

9. Control Unit according to claim 1, wherein each said switching device (38,40) includes a BUSCLEAR register (240) accessible to the SP (14) for generating RESET-P and RESET-S signals outputted by any Switch part on any primary or secondary bus (52,54,46,48) for clearing it after each configuration change of the Control Unit.

10. Control Unit according to claim 1, wherein each said switching device (38,40) includes a DISCONNECT LATCH (254,256) accessible to the SP (14) by two special lines DISC-SW-A (250) and DISC-SW-B (252) for the direct disconnection of said Switch parts by the Service Processor, in case of an internal failure of a SW part.

* * * * *